US011235262B2

(12) United States Patent
Osaki et al.

(10) Patent No.: US 11,235,262 B2
(45) Date of Patent: Feb. 1, 2022

(54) GAS-LIQUID SEPARATOR

(71) Applicant: Marelli Cabin Comfort Japan Corporation, Saitama (JP)

(72) Inventors: Tatsuya Osaki, Saitama (JP); Mitsuaki Nagata, Saitama (JP); Akihiro Okajima, Saitama (JP)

(73) Assignee: Marelli Cabin Comfort Japan Corporation, Saitama (JP)

( * ) Notice: Subject to any disclaimer, the term of this patent is extended or adjusted under 35 U.S.C. 154(b) by 447 days.

(21) Appl. No.: 16/465,798

(22) PCT Filed: Nov. 8, 2017

(86) PCT No.: PCT/JP2017/040317
§ 371 (c)(1),
(2) Date: May 31, 2019

(87) PCT Pub. No.: WO2018/100996
PCT Pub. Date: Jun. 7, 2018

(65) Prior Publication Data
US 2019/0299126 A1    Oct. 3, 2019

(30) Foreign Application Priority Data
Dec. 1, 2016  (JP) .............................. JP2016-234035

(51) Int. Cl.
*B01D 19/00* (2006.01)
*B60H 1/32* (2006.01)
(Continued)

(52) U.S. Cl.
CPC ........... *B01D 19/0063* (2013.01); *B01D 1/14* (2013.01); *B01D 1/28* (2013.01); *B01D 19/0068* (2013.01);
(Continued)

(58) Field of Classification Search
CPC ............ B01D 19/0063; B01D 19/0068; B01D 19/0036; B01D 19/0005; B01D 1/14;
(Continued)

(56) References Cited

U.S. PATENT DOCUMENTS 5,704,226 A * 1/1998 Beckwith ............. B60H 1/3229
285/26
2013/0186131 A1 7/2013 Guitar

FOREIGN PATENT DOCUMENTS

JP    S60004771 A    1/1985
JP    H08226730 A    9/1996
(Continued)

*Primary Examiner* — Robert Clemente
*Assistant Examiner* — Hafiz Muhammad Aamir
(74) *Attorney, Agent, or Firm* — Young Basile Hanlon & MacFarlane, P.C.

(57) ABSTRACT

This gas-liquid separator is provided with: a tank part which stores and separates a refrigerant; and a pipe connection part forming outlet/inlet ports for the refrigerant from the tank part. The pipe connection part has: a first connection part having a first connection pipe which guides the refrigerant to an expansion valve; a second connection part having a second connection pipe through which the cooled refrigerant returns; a third connection part having a third connection pipe which guides the refrigerant to a compressor; a fourth connection part having a fourth connection pipe which guides the refrigerant into the tank part from an outdoor heat exchanger; and a first flow path switching valve which allows the inside of the tank part to communicate with the third connection pipe during heating operations, and allows the second connection pipe to communicate with the third connection pipe during cooling operations.

8 Claims, 14 Drawing Sheets

(51) Int. Cl.
  *F25B 13/00* (2006.01)
  *F25B 43/00* (2006.01)
  *F25B 41/40* (2021.01)
  *B01D 1/14* (2006.01)
  *B01D 1/28* (2006.01)

(52) U.S. Cl.
  CPC ............... B60H 1/32 (2013.01); F25B 13/00 (2013.01); F25B 41/40 (2021.01); F25B 43/00 (2013.01); F25B 2400/23 (2013.01)

(58) Field of Classification Search
  CPC .......... B01D 1/28; B01D 5/006; F25B 13/00; F25B 43/00; F25B 43/006; F25B 2400/23; F25B 41/40; F25B 5/04; F25B 6/04; F25B 40/00; F25B 2400/0409; F25B 2400/0403; F25B 2500/18; F25B 41/20; B60H 1/3229; B60H 1/32
  See application file for complete search history.

(56) References Cited

FOREIGN PATENT DOCUMENTS

| | | |
|---|---|---|
| JP | H10311624 A | 11/1998 |
| JP | 2006327350 A | 12/2006 |
| JP | 2009198060 A | 9/2009 |
| JP | 2013148229 A | 8/2013 |
| JP | 2013535372 A | 9/2013 |

\* cited by examiner

GAS-LIQUID SEPARATOR

CROSS-REFERENCE TO RELATED APPLICATION

This application claims priority to Japanese Patent Application Serial No. 2016-234035, filed Dec. 1, 2016, the entire disclosure of which is hereby incorporated by reference.

TECHNICAL FIELD

The present invention relates to a gas-liquid separator.

BACKGROUND

In JP 2013-535372 A, an air conditioning loop that can be switched between a cooling mode and a heating mode is disclosed. The air conditioning loop is provided with the gas-liquid separator, that separates the refrigerant guided from an external heat exchanger into a gas phase refrigerant and a liquid phase refrigerant from each other, and that exhausts the refrigerant out of the first outlet or the second outlet in accordance with the operation mode of the air conditioning loop.

In the gas-liquid separator of the JP 2013-535372 A, however, the first outlet and the second outlet are provided in the upper portion and the lower portion, respectively. Therefore, the structure of the container of the gas-liquid separator and the structure of the connection unit of the piping may become complicated.

SUMMARY

An object of the present invention is to simplify the piping, connecting the a system having a gas-liquid separator and the other components.

In an aspect of the present invention, a gas-liquid separator applied to a refrigerating cycle comprises: a compressor for compressing refrigerant; an exterior heat exchanger for exchanging heat between the refrigerant and external air; an evaporator for evaporating the refrigerant by having the refrigerant absorb the heat of the air guided into a vehicle compartment; a heater for heating the air guided into the vehicle compartment by using the heat of the refrigerant compressed by the compressor; and an expansion valve for decompressing and expanding the refrigerant that has passed through the exterior heat exchanger; wherein the gas-liquid separator guides the incoming refrigerant from the exterior heat exchanger into the compressor during heating operation, and guides the incoming refrigerant from the exterior heat exchanger into the expansion valve during cooling operation; wherein the gas-liquid separator includes a tank unit storing refrigerant to separate a gas phase refrigerant and a liquid phase refrigerant from each other, and a piping connection unit provided on top of the tank unit, forming an inlet and outlet of the refrigerant from the tank unit; wherein the piping connection unit comprises: a first connection unit connected to a first connection piping for guiding the refrigerant into the expansion valve; a second connection unit connected to a second connection piping in which the refrigerant that has passed through the evaporator returns; a third connection unit connected to a third connection piping for guiding the refrigerant into the compressor; a fourth connection unit connected to a fourth connection piping for guiding the refrigerant from the exterior heat exchanger into the tank unit; and a switching valve for allowing the interior of the tank unit to communicate with the third connection piping during heating operation, and allowing the second connection piping to communicate with the third connection piping during cooling operation.

In the above aspect, the first connection piping, the second connection piping, the third connection piping, and the fourth connection piping are all connected to the piping connection unit in the upper unit of the tank unit, and an switching valve for switching the path of the refrigerant during heating operation and the cooling operation is provided in the piping connection unit. Therefore, all the pipings connected to the gas-liquid separator can be integrated into the piping connection unit, the piping necessary for providing the switching valve to the outside can be omitted. Therefore, the piping, connecting the gas-liquid separator and the other components, can be made simplified.

BRIEF DESCRIPTION OF THE DRAWINGS

FIG. 9 is a view showing a case where the first flow path switching valve is in a closed state;

DETAILED DESCRIPTION

Embodiments of the present invention are described with reference to the drawings as follows:

First Embodiment

Hereinafter, a gas-liquid separator 27 according to a first embodiment of the present invention is illustrated with reference to FIGS. 1 to 7B.

Figure 1:
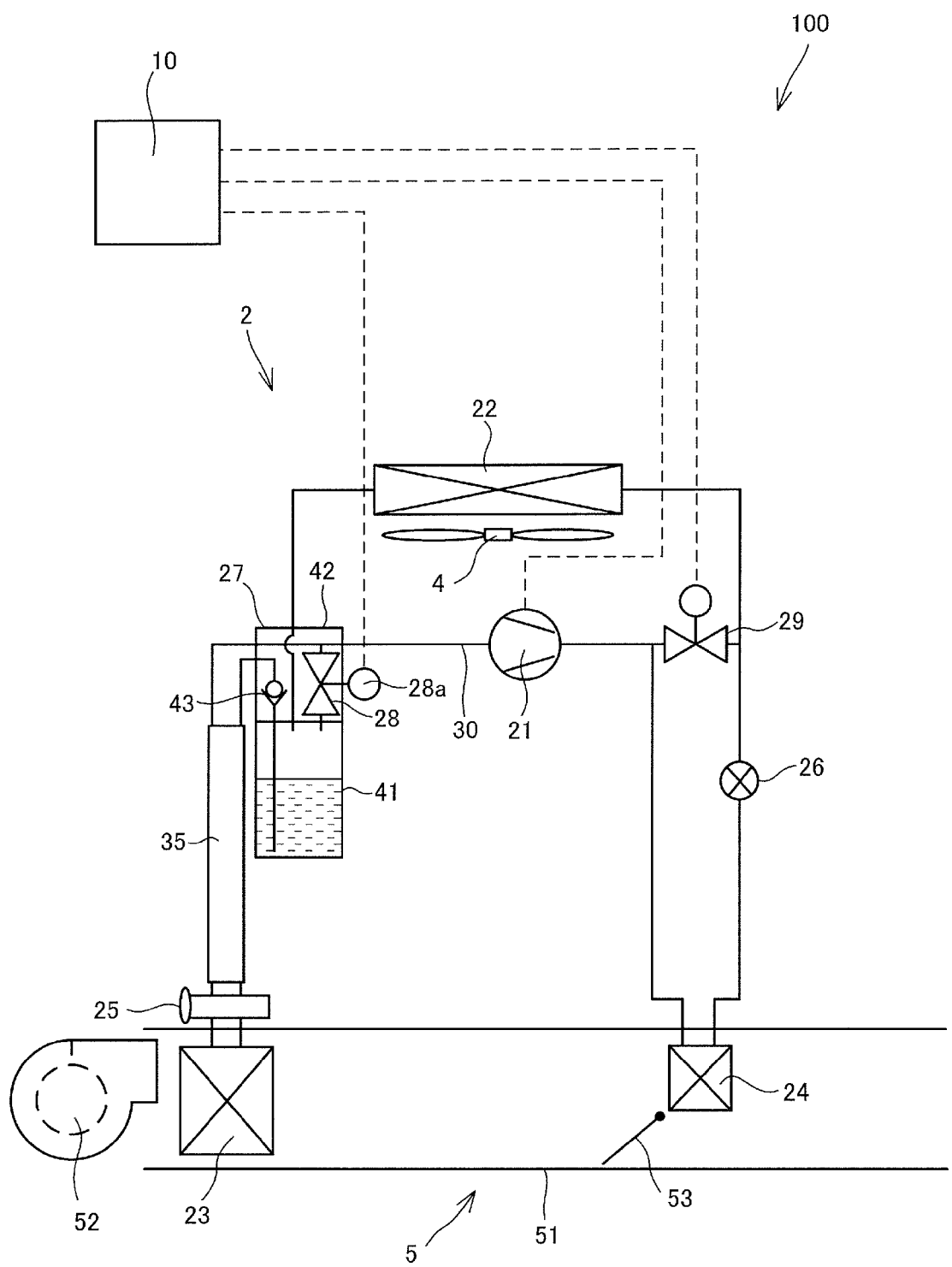
FIG. 1 is a configuration diagram of an air conditioner to which a gas-liquid separator according to a first embodiment of the present invention is applied.
Figure 2:
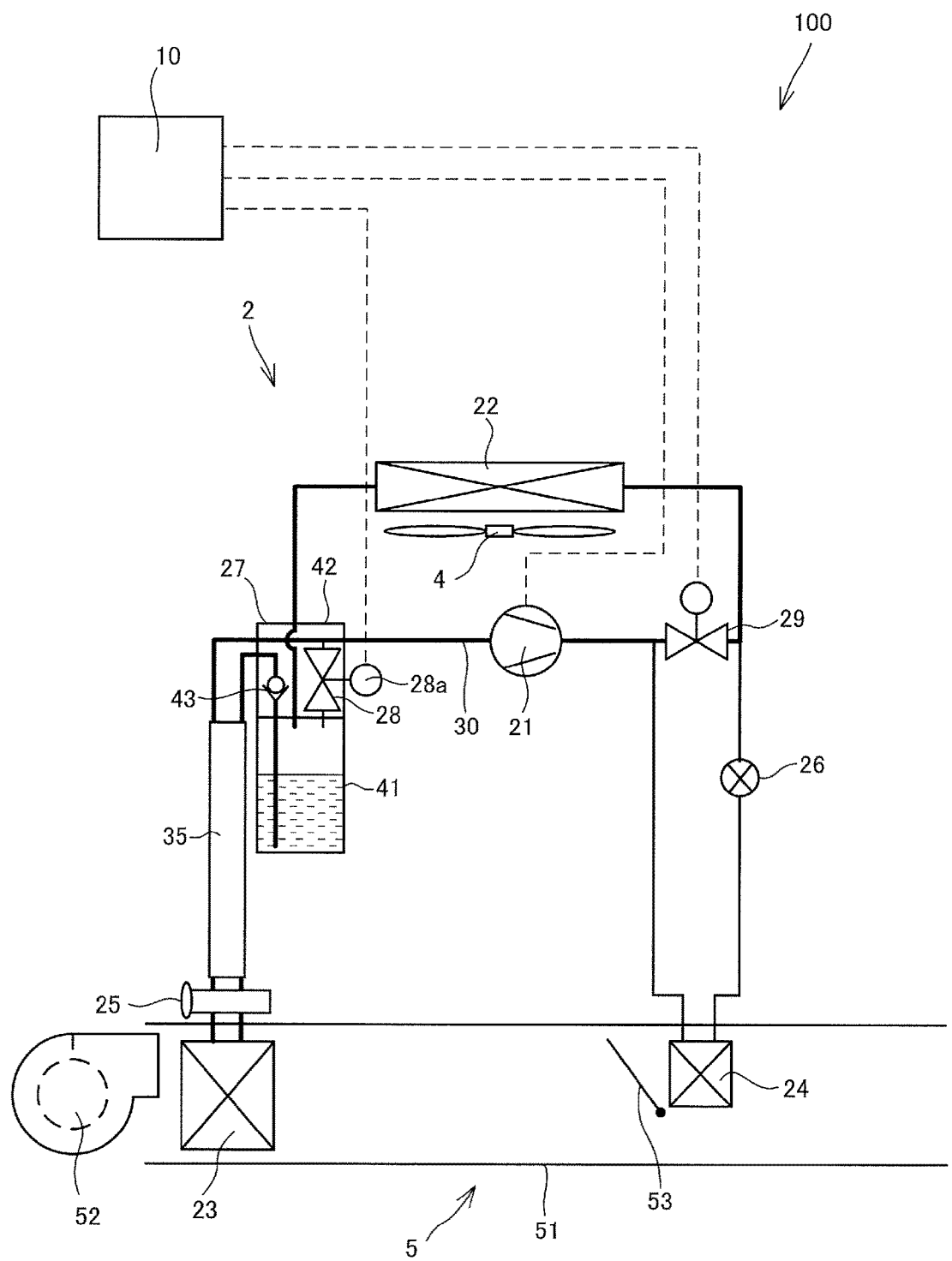
FIG. 2 is a diagram for illustrating the flow of refrigerant in the air conditioner during cooling operation.
Figure 3:
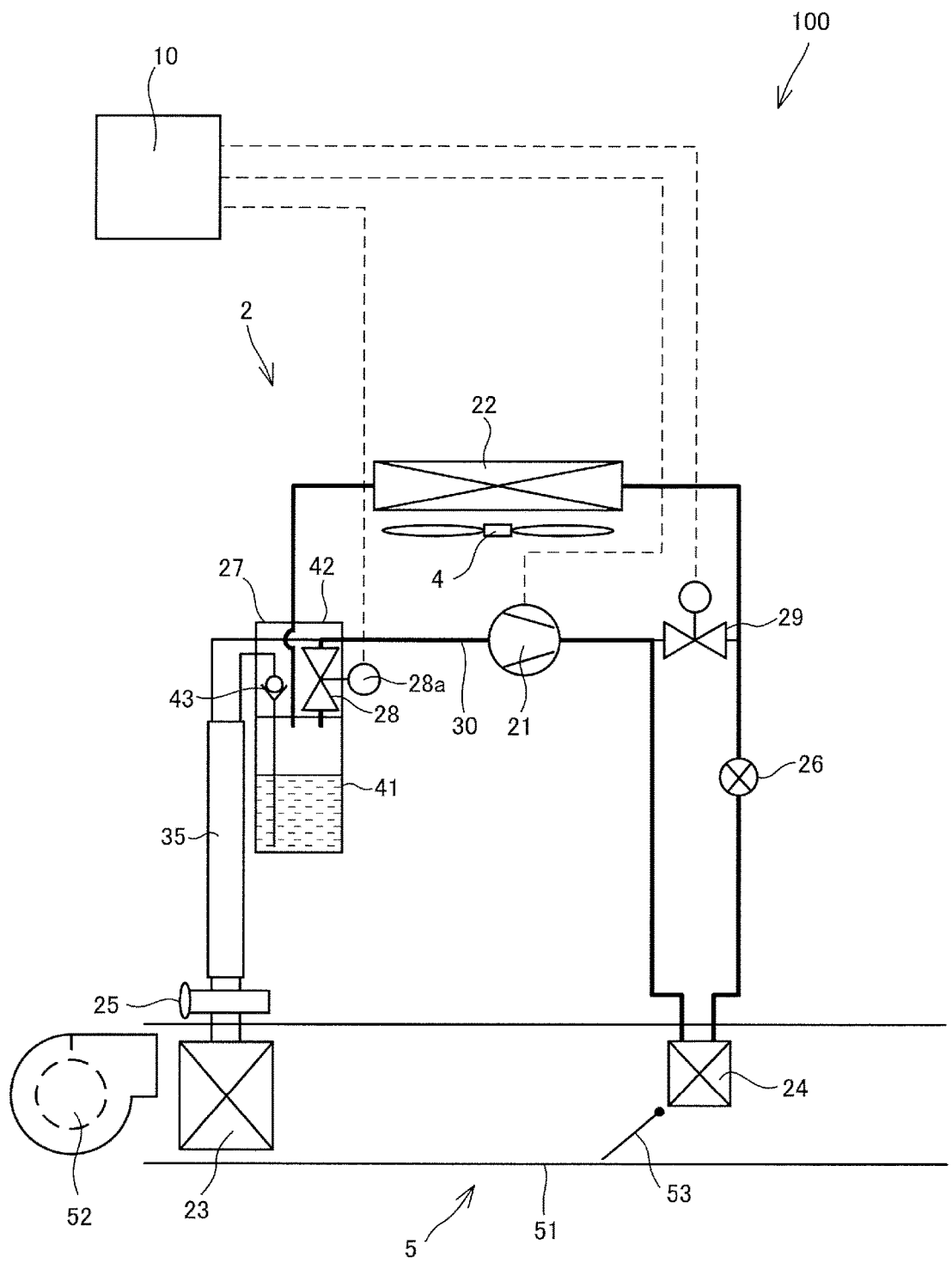
FIG. 3 is a diagram for illustrating the flow of refrigerant in the air conditioner during heating operation.

Firstly, referring to FIGS. 1 to 3, the air conditioner 100, to which the gas-liquid separator 27 is applied, is illustrated.

As shown in FIG. 1, the air conditioning apparatus 100 includes a refrigeration cycle 2 through which refrigerant circulates, a Heating Ventilation and Air Conditioning (HVAC) unit 5 through which air used for air conditioning passes, and a controller 10 as a control unit for controlling the operation of the air conditioner 100. The air conditioner 100 is a heat pump system capable of cooling and heating. The air conditioner 100 is mounted on a vehicle (not shown) to perform air conditioning in a vehicle compartment (not shown).

The refrigeration cycle 2 includes a compressor 21 as a compressor, an exterior heat exchanger 22, an internal heat exchanger 35, a heat exchanger for cooling 23 as an evaporator, a heat exchanger for heating 24 as a heater, a thermal expansion valve 25 as an expansion valve, a fixed throttle 26 as an expansion valve, a gas-liquid separator 27, and a refrigerant flow path 30 connected to allow the refrigerant to circulate. A first flow path switching valve 28 as a switching valve and a second flow path switching valve 29 are provided in the refrigerant flow path 30. The refrigerant circulating in the refrigeration cycle 2 is, for example, HFO-1234yf.

The compressor 21 sucks and compresses gaseous (gas phase) refrigerant. As a result, the gaseous refrigerant has become high temperature and high pressure.

The exterior heat exchanger 22 is disposed, for example, in an engine room (a motor room in case with an electric vehicle) 3 of a vehicle, and performs heat exchange between the refrigerant and the outside air. The exterior heat exchanger 22 functions as a condenser during cooling operation, and functions as an evaporator during heating operation. External air is introduced into the exterior heat exchanger 22 by traveling of the vehicle and rotation of the exterior fan 4.

The heat exchanger for cooling 23 is disposed in the HVAC unit 5. The heat exchanger for cooling 23 causes the refrigerant to absorb heat of the air guided into the vehicle compartment to evaporate the refrigerant, when the heat pump operation is in the cooling operation mode. The refrigerant evaporated in the heat exchanger for cooling 23 flows into the gas-liquid separator 27 via the internal heat exchanger 35.

The heat exchanger for heating 24 is disposed in the HVAC unit 5. The heat exchanger for heating 24 functions as a condenser for condensing the refrigerant after passing through the compressor 21, when the heat pump operation is in the heating operation mode. The heat exchanger for heating 24 heats the air guided into the vehicle interior, by having the air absorb the heat of the refrigerant. The refrigerant condensed by the heat exchanger for heating 24 flows to the fixed throttle 26.

The thermal expansion valve 25 is disposed between the internal heat exchanger 35 and the heat exchanger for cooling 23, and decompresses and expands the refrigerant of the liquid (liquid phase) refrigerant guided from the exterior heat exchanger 22 via the gas-liquid separator 27 and the internal heat exchanger 35. The thermal expansion valve 25 automatically adjusts the degree of opening, according to the temperature of the refrigerant passing through the heat exchanger for cooling 23, i.e. the degree of superheat of the gaseous refrigerant.

When the load of the heat exchanger for cooling 23 increases, the degree of superheat of the gaseous refrigerant is increased. As a result, the degree of opening of the thermal expansion valve 25 is increased, and the amount of refrigerant is increased so as to adjust the degree of superheat. On the other hand, when the load of the heat exchanger for cooling 23 decreases, the degree of superheat of the gaseous refrigerant is decreased. As a result, the degree of opening of the thermal expansion valve 25 is decreased, and the amount of refrigerant is decreased so as to adjust the degree of superheat. As described above, the thermal expansion valve 25 feeds back the temperature of the gaseous refrigerant passing through the heat exchanger for cooling 23 to adjust the degree of opening, so that the gaseous refrigerant becomes an appropriate degree of superheat.

The internal heat exchanger 35 performs heat exchange between the refrigerant upstream of the thermal expansion valve 25 and the refrigerant downstream of the heat exchanger for cooling 23, by using the temperature difference.

The fixed throttle 26 is disposed between the heat exchanger for heating 24 and the exterior heat exchanger 22, and decompresses and expands the liquid refrigerant, compressed by the compressor 21 and condensed by the heat exchanger 24 for heating. As for the fixed throttle 26, for example, an orifice or a capillary tube is used. The aperture amount of the fixed throttle 26 is set in advance to correspond to a specific operating condition frequently used. Instead of the fixed throttle 26, for example, an electromagnetic valve capable of adjusting the degree of opening, stepwise or steplessly, may be used as a variable throttle (throttle mechanism).

The gas-liquid separator 27 temporarily stores the refrigerant, flowing through the refrigerant flow path 30, and separates into a gaseous refrigerant and a liquid refrigerant from each other. During heating operation, the gas-liquid separator 27 guides the gaseous refrigerant, flowing from the exterior heat exchanger 22, to the compressor 21. Only the separated gaseous refrigerant flows from the gas-liquid separator 27 to the compressor 21. During cooling operation, the gas-liquid separator 27 guides the liquid refrigerant, flowing from the exterior heat exchanger 22, to the thermal expansion valve 25 via the internal heat exchanger 35. Only the separated liquid refrigerant flows from the gas-liquid separator 27 to the thermal expansion valve 25. The gas-liquid separator 27 includes a tank unit 41 and a piping connection unit 42.

The tank unit 41 stores the refrigerant therein, and separates the gaseous refrigerant and the liquid refrigerant by gravity. The tank unit 41 is provided so that its central axis is vertical. In the tank unit 41, the liquid refrigerant is stored in the lower side, and the gaseous refrigerant is stored in the space above the liquid refrigerant.

The piping connection unit 42 is provided in the upper part of the tank unit 41 and forms an inlet and an outlet of the refrigerant from the tank unit 41. The piping connection unit 42 includes a first flow path switching valve 28 and a differential pressure valve 43. All the pipings, connected to the gas-liquid separator 27, are integrated in the piping connecting unit 42. Therefore, the piping, necessary for providing the first flow path switching valve 28 and the differential pressure valve 43 to the outside, can be omitted, allowing the piping connecting the gas-liquid separator 27 and the other components to be simplified.

The differential pressure valve 43 opens, when the pressure of the refrigerant, guided to the thermal expansion valve 25 during cooling operation, exceeds a predetermined pressure. This predetermined pressure is set to such a pressure that the differential pressure valve 43 opens only during cooling operation, and that the differential pressure valve 43 does not open during heating operation. By providing the differential pressure valve 43, it is possible to prevent the refrigerant to flow from the gas-liquid separator 27 to the heat exchanger for cooling 23 via the thermal expansion valve 25 during heating operation.

The first flow path switching valve 28 switches the flow of the refrigerant by opening and closing. The first flow path switching valve 28 is an electromagnetic valve having a solenoid 28a as an actuator controlled by the controller 10. The first flow path switching valve 28 is integrally provided in the piping connection unit 42, allowing the piping and the entire configuration of the air conditioner 100 to be simplified.

During cooling operation, the first flow path switching valve 28 is closed. Thus, the refrigerant condensed in the exterior heat exchanger 22 flows into the gas-liquid separator 27, the liquid refrigerant passes through the internal heat exchanger 35, the thermal expansion valve 25 and the heat exchanger for cooling 23, and returns to the gas-liquid separator 27. Since the first flow path switching valve 28 is closed, the gaseous refrigerant returning to the gas-liquid separator 27 does not flow into the tank unit 41 of the gas-liquid separator 27, and is directly guided to the compressor 21 through the piping connecting unit 42. On the other hand, during heating operation, the first flow path switching valve 28 is opened. Thus, the refrigerant evaporated in the exterior heat exchanger 22 flows into the gas-liquid separator 27, the refrigerant passes through the first flow path switching valve 28 and is guided to the compressor 21. Therefore, during heating operation, the refrigerant flows by bypassing the internal heat exchanger 35, the thermal expansion valve 25, and the heat exchanger for cooling 23.

In a state, where the first flow path switching valve 28 is opened, the refrigerant, flowing from the interior of the tank unit 41 through the first flow path switching valve 28, flows more easily in proportion to the smaller channel resistance than the refrigerant flowing back to the gas-liquid separator 27 from the interior of the tank unit 41 through the internal heat exchanger 35 passing through the thermal expansion valve 25, and the heat exchanger for cooling 23. Therefore, even when the differential pressure valve 43 is not provided, no refrigerant flow is generated from the interior of the tank unit 41 to the gas-liquid separator 27 through the internal heat exchanger 35, the thermal expansion valve 25, and the heat exchanger for cooling 23. As described above, the first flow path switching valve 28 switches the flow of the refrigerant by simply opening and closing the flow path to which the refrigerant flows easily. Therefore, to switch the flow of the refrigerant, no three-way valve is provided, or a plurality of switching valves are not used, the piping can be simplified, the entire configuration of the air conditioner 100 can be simplified.

The second flow path switching valve 29 switches the flow of the refrigerant by opening and closing. During cooling operation, the second flow path switching valve 29 is opened, the refrigerant compressed by the compressor 21 bypasses the heat exchanger for heating 24 and the fixed throttle 26, and directly flows into the exterior heat exchanger 22. On the other hand, during heating operation, the second flow path switching valve 29 is closed, the refrigerant compressed by the compressor 21 passes through the heat exchanger for heating 24 and the fixed throttle 26 and flows into the exterior heat exchanger 22.

The HVAC unit 5 cools or heats the air used for the air conditioning. The HVAC unit 5 includes a blower 52 that blows air, an air mix door 53 that adjusts the amount of air passing through the heat exchanger for heating 24, and a case 51 that surrounds the blower and the air mix door so as to allow the air used for air conditioning to pass therethrough. A heat exchanger for cooling 23 and a heat exchanger for heating 24 are disposed in the HVAC unit 5. The air blown from the blower 52 performs heat exchange between the refrigerant flowing in the heat exchanger for cooling 23 and the refrigerant flowing through the heat exchanger for heating 24.

The air mix door 53 is installed on the blower 52 side of the heat exchanger for heating 24 disposed in the HVAC unit 5. The air mix door 53 opens the side of the heat exchanger for heating 24 during heating operation, and closes the side of the heat exchanger for heating 24 during cooling. The degree of opening of the air mix door 53 adjusts the amount of heat exchange between the air and the refrigerant in the heat exchanger for heating 24.

The controller 10 is a microcomputer comprising a central processing unit (CPU), a read only memory (ROM), a random access memory (RAM), and the like. It is also possible to configure the controller 10 by a plurality of microcomputers. The controller 10 causes the air conditioner 100 to perform various functions by reading the program stored in the ROM by the CPU.

The controller 10 controls the refrigeration cycle 2. Specifically, the controller 10 is, as shown by a broken line in FIG. 1, sets the output of the compressor 21 and executes open/close control of the first flow path switching valve 28 and the second flow path switching valve 29. Further, the controller 10 performs control of the HVAC unit 5 by transmitting an output signal (not shown).

In the next, by referring to FIGS. 2 and 3, cooling operation and heating operation in the heat pump operation mode of the air conditioner 100 are illustrated.

(Cooling Operation)

During cooling operation, the refrigerant in the refrigerant flow path 30 circulates as indicated by a thick solid line in FIG. 2.

The controller 10 closes the first flow path switching valve 28 and opens the second flow path switching valve 29. Thus the refrigerant, compressed by the compressor 21 to be of a high temperature and high pressure, flows to the exterior heat exchanger 22 through the second flow path switching valve 29.

The refrigerant, flowing to the exterior heat exchanger 22, is cooled after having exchanged heat with the external air guided into the exterior heat exchanger 22, to be separated into gas and liquid from each other through the gas-liquid separator 27. A liquid refrigerant of the refrigerant separated by the gas-liquid separator 27, flows through the internal heat exchanger 35 to the thermal expansion valve 25 connected to the downstream side of the gas-liquid separator 27.

Thereafter, the liquid refrigerant is decompressed and expanded by the temperature expansion valve 25 and flows to the heat exchanger for cooling 23, and when passing through the heat exchanger for cooling 23, evaporates by absorbing the heat of air used for air conditioning. The gaseous refrigerant evaporated in the heat exchanger for cooling 23 does not enter the tank unit 41 of the gas-liquid separator 27, passes through the piping connection unit 42, and flows again to the compressor 21.

Wherein, the liquid refrigerant, flowing from the gas-liquid separator 27 to the internal heat exchanger 35, is a high-pressure fluid, and is separated into gas and liquid by the gas-liquid separator 27 so that the degree of overcooling is in a substantially saturated liquid state of approximately 0° C. On the other hand, the gaseous refrigerant, flowing from the heat exchanger for cooling 23 to the internal heat exchanger 35, expands under reduced pressure as it passes through the thermal expansion valve 25, and becomes a low-temperature fluid. Therefore, the liquid refrigerant exchanges heat with the low-temperature gaseous refrigerant when flowing through the internal heat exchanger 35, and is excessively cooled by the gaseous refrigerant, resulting in over cooled state having the over cooled degree from the saturated liquid state. Further, the gaseous refrigerant, when flowing through the internal heat exchanger 35, is heated by the liquid refrigerant to be in a heated state having a degree of superheat.

The air, cooled by the refrigerant in the heat exchanger for cooling 23, flows downstream of the HVAC unit 5 and is used as cooling wind.

(Heating Operation)

During heating operation, a so-called external air heat-absorbing heat pump operation is performed. In the heating operation, the refrigerant in the refrigerant flow path 30 circulates as indicated by a thick solid line in FIG. 3.

The controller 10 closes the second flow path switching valve 29 and opens the first flow path switching valve 28. As a result, the refrigerant compressed by the compressor 21 to a high temperature and a high pressure flows into the heat exchanger for heating 24. The refrigerant, flowing to the heat exchanger for heating 24, is deprived of its heat to be at a low temperature, when the air is heated in the heat exchanger for heating 24, and then, is decompressed and expanded through the fixed throttle 26 to be at a lower in temperature, flowing to the exterior heat exchanger 22.

The refrigerant, flowing to the exterior heat exchanger 22, absorbs heat after having exchanged heat with the outside air guided into the exterior heat exchanger 22, and then flows into the tank unit 41 of the gas-liquid separator 27, to be separated into gas and liquid from each other. Then, the gaseous refrigerant in the refrigerant, separated by the gas-liquid separator 27, passes through the first flow path switching valve 28, and flows again to the compressor 21.

The gaseous refrigerant, flowing through the heat exchanger for heating 24, heats the air around the heat exchanger for heating 24. The heated air flows downstream of the HVAC unit 5 and is used as heating wind.

Figure 4:
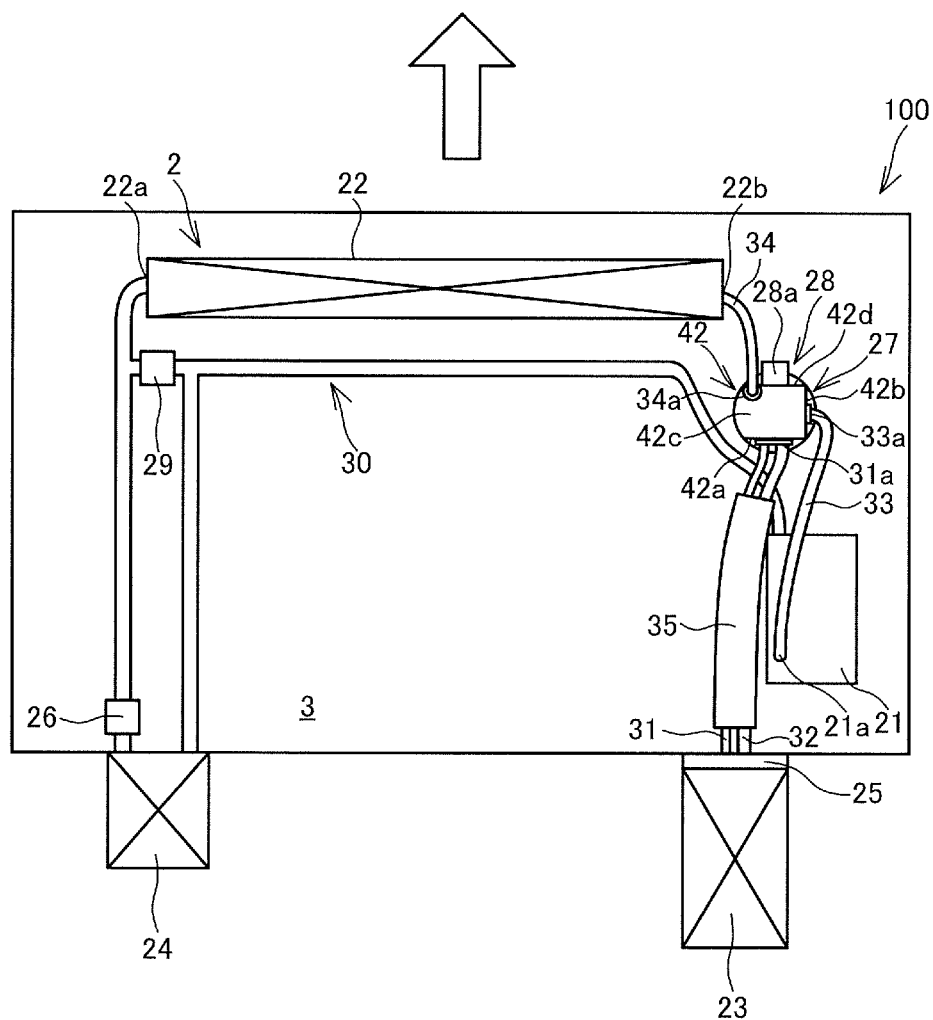
FIG. 4 is a plan view of an air conditioner installed in a vehicle.
Figure 5:
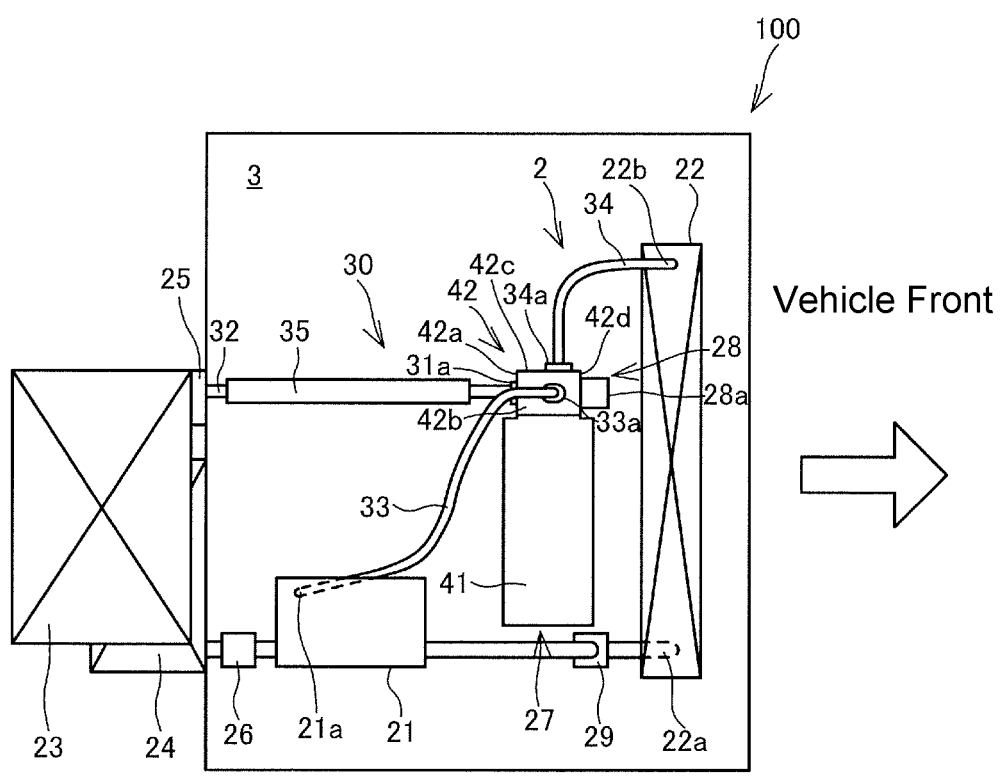
FIG. 5 is a right side view of FIG. 4.

In the next, by referring to FIGS. 4 and 5, the arrangement of the components in the air conditioner 100 is illustrated. In FIG. 4, the upper side is the front of the vehicle and the vehicle interior is located on the lower side. In FIG. 5, the right side is the front of the vehicle and the vehicle interior is located on the left side.

As shown in FIGS. 4 and 5, the exterior heat exchanger 22 is disposed at the front end portion of the engine room 3 so as to exchange heat between the refrigerant and the external air. On the other hand, the heat exchanger for cooling 23 and the heat exchanger for heating 24 are provided in the HVAC unit 5 and disposed at the rear end portion of the engine room 3 close to the vehicle cabin, in order to cool or heat the air guided into the interior of a vehicle.

The piping connection unit 42 of the gas-liquid separator 27 is connected to a first connection piping 31 for guiding the refrigerant to the thermal expansion valve 25, a second connection piping 32 for returning the refrigerant after passing through the thermal expansion valve 25 and the heat exchanger for cooling 23, a third connection piping 33 for guiding the refrigerant to the compressor 21, and a fourth connection piping 34 for guiding the refrigerant from the exterior heat exchanger 22 into the tank unit 41.

The piping connection unit 42 includes a first connection surface 42a, a second connection surface 42b, a third connection surface 42c, and a solenoid attachment surface 42d.

The first connection surface 42a is a plane formed toward the rear of the vehicle. The first connection piping 31 and the second connection piping 32 are connected to the first connection surface 42a. The first connection surface 42a is connected to a single flange unit 31a that is integrally coupled to the end portion of the first connection piping 31 and the second connection piping 32. As a result, the connection of the pipings can be facilitated.

The heat exchanger for cooling 23 is disposed behind the gas-liquid separator 27 in the engine room 3. Therefore, the first connection surface 42a is formed to face the heat exchanger for cooling 23, allowing the distance between the first connection piping 31 and the second connection piping 32 to be minimized.

The second connection surface 42b is a plane formed toward the side of the vehicle. The third connection piping 33 is connected to the second connection surface 42b. A flange unit 33a formed at an end portion of the third connection piping 33 is connected to the second connection surface 42b.

As the first connection surface 42a faces the rear of the vehicle and the second connection surface 42b faces the side of the vehicle, the third connection piping 33 is provided so as to be orthogonal to the second connection piping 32. Therefore, the flow direction of the refrigerant is shifted to a right angle in the piping connection unit 42. Accordingly, the third connection piping 33 which is bent rearward toward the compressor 21 is connected to the side of the vehicle, allowing the routing of piping to be made simplified. By operating the first flow path switching valve 28 during cooling operation, the piping connection unit 42 directly communicates with the second connection piping 32 and the third connection piping 33 without passing through the interior of the tank unit 41.

The third connection surface 42c is a plane formed at the upper end of the piping connection unit 42. The fourth connection piping 34 is connected to the third connection surface 42c. A flange unit 34a formed at the end portion of the fourth connection piping 34 is connected to the third connection surface 42c.

The solenoid mounting surface 42d is a plane formed toward the front of the vehicle. The solenoid 28a is attached to the solenoid mounting surface 42d, so that the valve body 28b of the first flow path switching valve 28 is inserted into the piping connecting unit 42.

Figure 6:
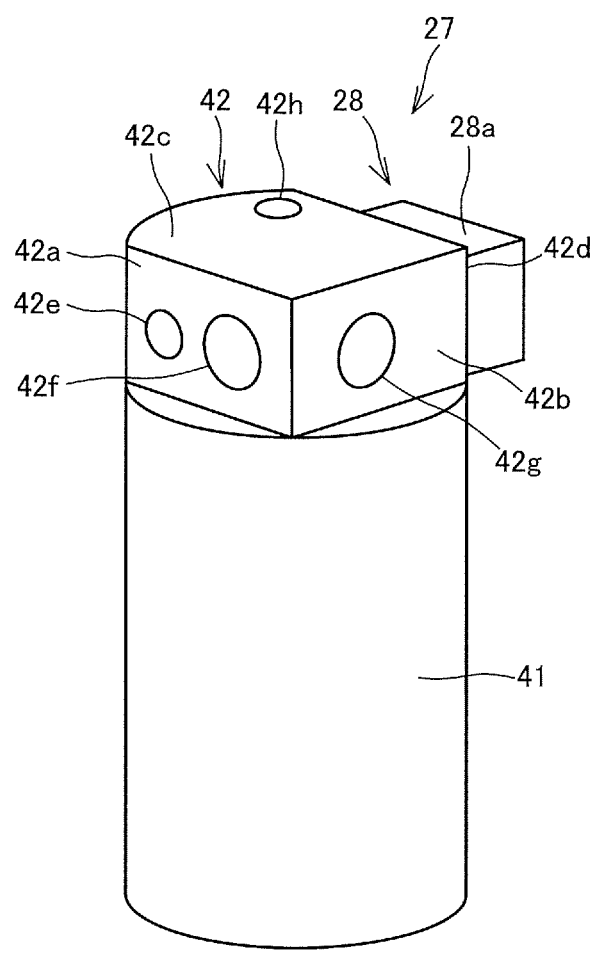
FIG. 6 is a perspective view of a gas-liquid separator according to a first embodiment of the present invention.
Figure 7A:
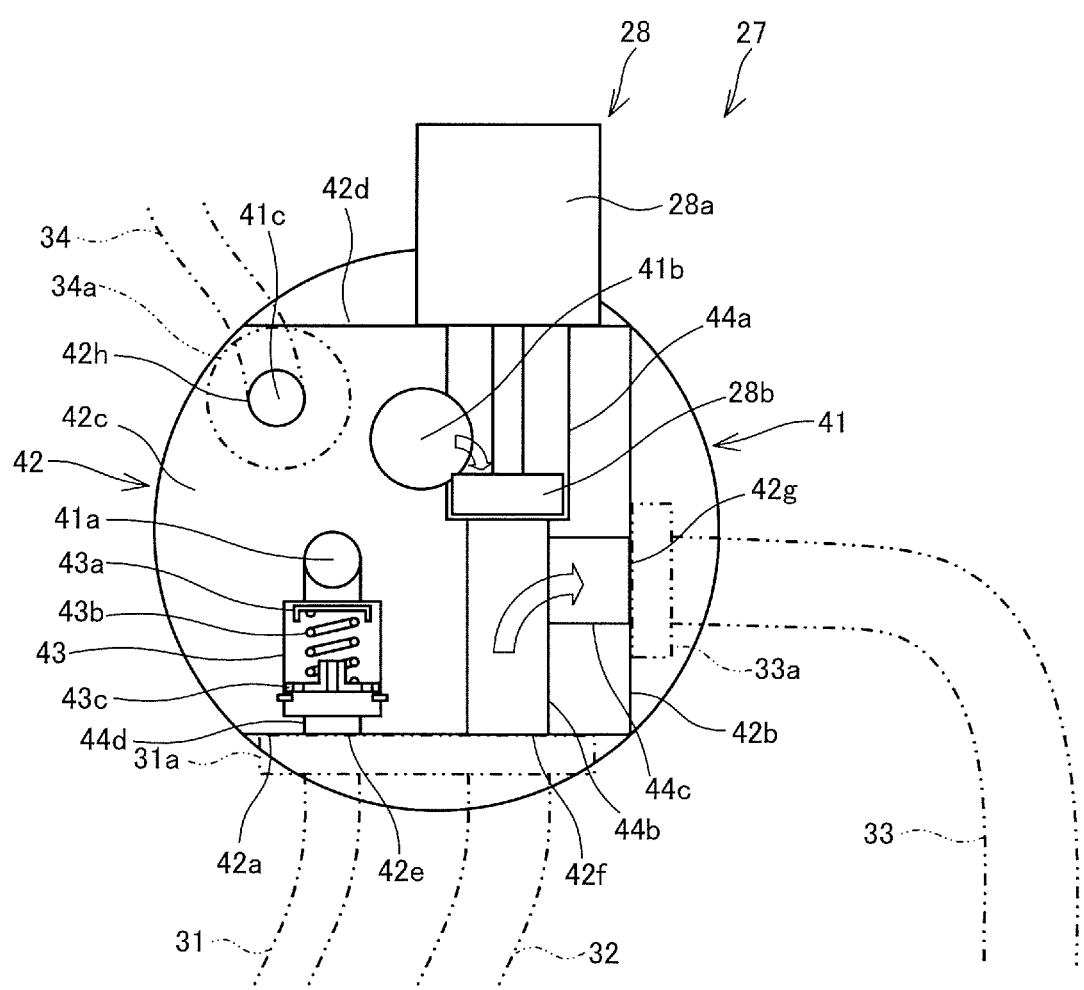
FIG. 7A is a cross-sectional view of a plane of the piping connection unit shown in FIG. 6.
Figure 7B:
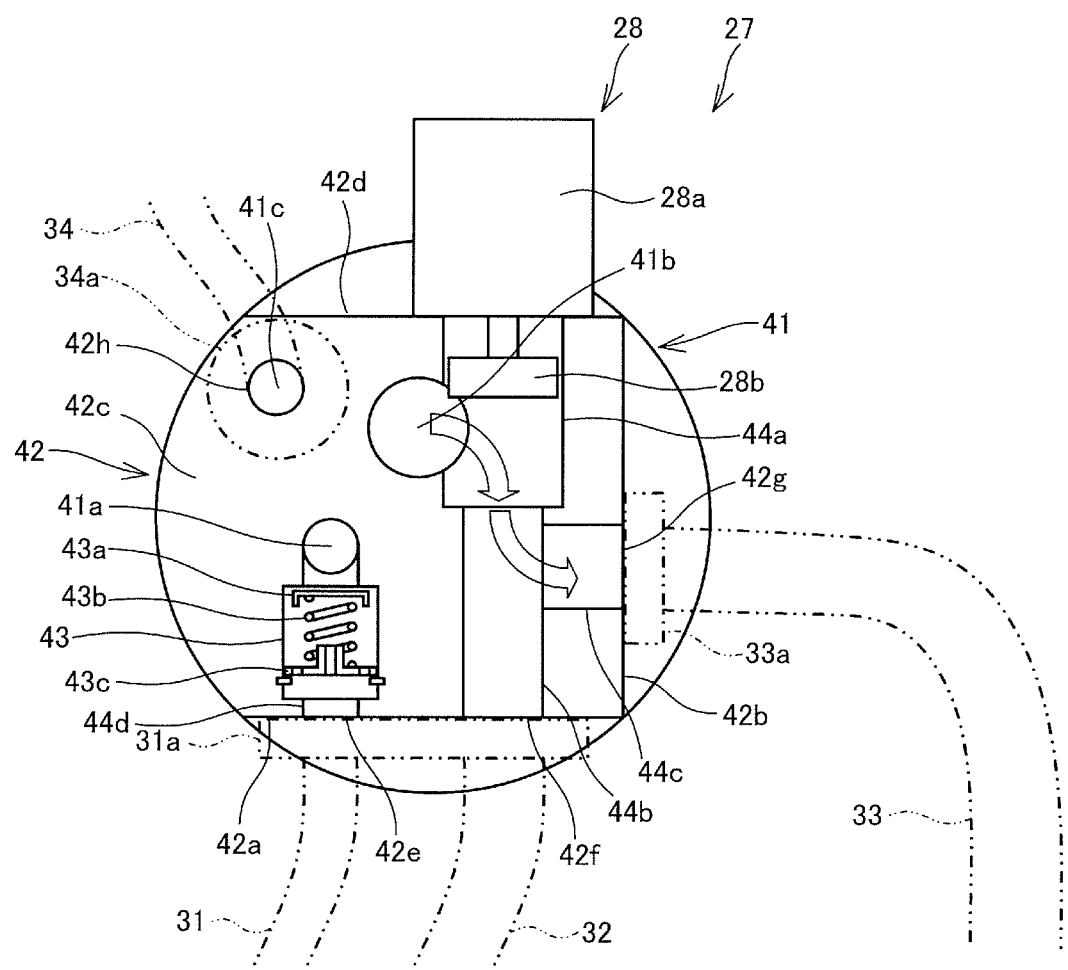
FIG. 7B is a diagram illustrating a case where the first flow path switching valve is in an open state in FIG. 7A.

In the next, by referring to FIGS. 6 to 7B, a specific configuration of the piping connecting unit 42 in the gas-liquid separator 27 is illustrated.

As shown in FIG. 6, the piping connection unit 42 includes a first connection unit 42e to which the first connection piping 31 is connected, a second connection unit 42f to which a second connection piping 32 is connected, a third connection unit 42g to which the third connection piping 33 is connected, a fourth connection unit 42h to which the fourth connection piping 34 is connected, and a first flow path switching valve 28.

The first connection unit 42 e is formed on the first connection surface 42 a of the piping connection unit 42.

The second connection unit 42f is formed on the first connection surface 42a transversely adjacent to the first connection unit 42e. Accordingly, the first connection piping 31 and the second connection piping 32, both of which go through the temperature type expansion valve 25 and the heat exchanger for cooling 23 and return, have the connection unit formed on the same first connection surface 42a, allowing the piping to be made simplified. Alternatively, the first connection unit 42e and the second connection unit 42f may be formed longitudinally adjacent to the first connection surface 42a.

The third connection unit 42g is formed on the second connection surface 42b orthogonal to the first connection surface 42a. Accordingly, the third connection piping 33 that is bent rearward toward the compressor 21 is connected to the side of the vehicle, allowing the routing of the piping to be made simplified.

As described above, the first connection unit 42e, the second connection unit 42f, and the third connection unit 42g are formed on the side surface of the piping connection unit 42. Accordingly, the height of the piping connection unit 42 can be minimized.

The fourth connection unit 42h is formed on the third connection surface 42c which is the upper surface of the piping connection unit 42. The exterior heat exchanger is disposed such that the refrigerant outlet 22b is located relatively above the refrigerant inlet 22a (see FIG. 5). Therefore, the piping connecting the exterior heat exchanger 22 and the gas-liquid separator 27 can be short.

As shown in FIGS. 7A and 7B, the liquid refrigerant lead-out pipe 41a, the gaseous refrigerant lead-out pipe 41b, and the refrigerant introducing pipe 41c are connected to the piping connection part 42. The liquid refrigerant lead-out pipe 41a guides the liquid refrigerant to the exterior from the interior of the tank unit 41. The gaseous refrigerant outlet pipe 41b guides the gaseous refrigerant from the interior of the tank unit 41 to the exterior. The refrigerant introducing pipe 41c guides the refrigerant guided from the exterior heat exchanger 22 into the tank unit 41.

The piping connection unit 42 includes a first internal piping 44a, a second internal piping 44b, a third internal piping 44c, and a fourth internal piping 44d.

The gaseous refrigerant is guided to the first internal piping 44a through the gaseous refrigerant lead-out pipe 41b from the interior of the tank unit 41. The gaseous refrigerant guided in vertical direction from the gaseous refrigerant outlet pipe 41b is shifted by 90 degrees in the advancing direction so as to move in horizontal direction, and is guided to the first internal piping 44a. The first internal piping 44a further changes the advancing direction of the gaseous refrigerant by 90 degrees in horizontal direction. The first internal piping 44a is provided with a first flow path switching valve 28.

The first flow path switching valve 28 allows the interior of the tank unit 41 to communicate with the third connection piping 33 during heating operation, and allows the second connection piping 32 to communicate with the third connection piping 33 during cooling operation. The first flow path switching valve 28 includes a valve element 28b that advances and retreats within the piping connection unit 42, and a solenoid 28a that drives the valve element 28b.

The solenoid 28a is controlled by the controller 10. The solenoid 28a advances and retreats the valve body 28b based on an output signal from the controller 10. The solenoid 28a is unexcited during cooling operation, and is excited during heating operation.

When the solenoid 28a is unexcited, the valve body 28b is retracted from the solenoid 28 a by the biasing force of a biased spring (not shown). Accordingly, the blocked state of the first internal piping 44a and the second internal piping 44b is maintained. On the other hand, when the solenoid 28a is excited, the valve element 28 b overcomes the biasing force of the biased spring and retreats. Thus, the first internal piping 44a and the second internal piping 44b communicate with each other, the refrigerant is guided from the interior of the tank unit 41 toward the compressor 21.

In the cooling operation, the valve body 28b maintains the blocked state by the pressure of the refrigerant flowing from the interior of the tank unit 41 toward the compressor 21 as the back pressure (the state shown in FIG. 7A). This allows the solenoid 28a of the first flow path switching valve 28 to be smaller because maintaining the blocked state does not require a large force.

The second internal piping 44 b is connected to the second connection piping 32. The second internal piping 44b communicates with the first internal piping 44a in a straight line shape. As shown in FIG. 7A, during cooling operation, the gaseous refrigerant is guided from the second connection piping 32 to the second internal piping 44b. On the other hand, as shown in FIG. 7B, during heating operation, the gaseous refrigerant is guided from the first internal piping 44a to the second internal piping 44b.

The third internal piping 44c is connected to the third connection piping 33. The third internal piping 44c is connected to the second internal piping 44b so as to further turn the advancing direction of the gaseous refrigerant by 90 degrees in horizontal direction. The third internal piping 44c guides the gaseous refrigerant from the second internal piping 44b to the third connection piping 33.

The fourth internal piping 44d is connected to the first connection piping 31. The fourth internal piping 44d moves the liquid refrigerant guided in vertical direction from the liquid refrigerant lead-out piping 41a in horizontal direction, the moving direction is changed by 90 degrees. The fourth internal piping 44d guides the liquid refrigerant to the first connection piping 31. The fourth internal piping 44d is provided with a differential valve 43.

The differential valve 43 includes a seal unit 43a, a biased spring 43b, and a spring seat 43c. During heating operation, the differential valve 43 maintains the fourth internal piping 44d in the blocked state by the biasing force of the biased spring 43b. On the other hand, the differential valve 43 is operated during cooling operation, when the pressure of the liquid refrigerant guided from the tank unit 41 through the liquid refrigerant outlet pipe 41a exceeds a predetermined pressure, the pressure of the liquid refrigerant overcomes the biasing force of the biased spring 43b to move the seal unit 43a such that the fourth internal piping 44d is in a state of being communicated.

According to the first embodiment described above, the following effects are achieved.

The gas-liquid separator 27 includes a tank unit 41 for storing the refrigerant to separate the gaseous refrigerant and the liquid refrigerant, and a piping connection unit 42 provided on top of the tank unit 41 to form an inlet and an outlet of the refrigerant from the tank unit 41. The piping connection unit 42 has the first connection unit 42e to which the first connection piping 31 is connected, guiding the refrigerant to the temperature type expansion valve 25, the second connection unit 42f to which a second connection piping 32 is connected in which the refrigerant that went through the heat exchanger for cooling 23 returns, the third connection unit 42g to which a third connection piping 33 is connected guiding the refrigerant into the compressor 21, the fourth connection unit 42h to which the fourth connection piping 34 is connected guiding the refrigerant from the exterior heat exchanger 22 into the tank unit 41, and the first flow path switching valve 28 for communicating between the interior of the tank unit and the third connection piping 33 during heating operation, and for communicating between the second connection piping 32 and the third connection 33 during cooling operation.

As a result, the first connection piping 31, the second connection piping 32, the third connection piping 33, and the fourth connection piping 34 are all connected to the piping connection unit 42 in the upper part of the tank unit 41, providing the first flow path switching valve 28 in the piping connecting unit 42 for switching the path of the refrigerant during heating operation and cooling operation. Therefore, all the pipings connected to the gas-liquid separator 27 can be integrated into the piping connection unit 42 thereby allowing the piping necessary for providing the first flow path switching valve 28 in the outside to be omitted. Therefore, the piping connecting the gas-liquid separator 27 with the other components can be made simplified.

In the gas-liquid separator 27, the first flow path switching valve 28 blocks the flow of the refrigerant from the interior of the tank unit 41 toward the compressor 21 during cooling operation, thereby directly communicating between the second connection piping 32 and the third connection piping 33 within the piping connection unit 42.

Accordingly, the flow of the refrigerant can be switched by the single first flow path switching valve 28, allowing the structure to be made simplified, reducing the cost.

In the gas-liquid separator 27, the first flow path switching valve 28 includes a valve element 28 b that advances and retreats within the interior of the piping connection unit 42. The valve body 28b maintains the pressure of the refrigerant flowing from the tank unit 41 toward the compressor 21 as the back pressure during cooling operation.

Accordingly, by having the pressure of the gaseous refrigerant as the back pressure to maintain a blocking state, the solenoid 28a of the first flow path switching valve 28 can be made small.

In the gas-liquid separator 27, the first connection unit 42e is formed on the first connection surface 42a of the piping connection unit 42, and the second connection unit 42f is formed on the first connection surface 42a.

Accordingly, the first connection piping 31 and the second connection piping 32, both of which go through the temperature type expansion valve 25 and the heat exchanger for cooling 23 and return have the connection unit formed on the same first connection surface 42a, allowing the piping to be made simplified.

In addition, in the gas-liquid separator 27, the third connection unit 42g is formed on the second connection surface 42b orthogonal to the first connection surface 42a.

As a result, since the third connection piping 33 that is bent rearward toward the compressor 21 is connected to the side of the vehicle, the routing of the piping is simplified.

In the gas-liquid separator 27, the first connection unit 42e, the second connection unit 42f, and the third connection unit 42g are formed on the side surface of the piping connection unit 42.

Thus, since the first connection unit 42e, the second connection unit 42f, and the third connection unit 42g are formed on the side surface of the piping connection unit 42, the height of the piping connection unit 42 can be made minimized.

In the gas-liquid separator 27, the piping connection unit 42 has a differential valve 43 that opens when the pressure of the refrigerant guided to the temperature expansion valve 25 exceeds a predetermined pressure during cooling operation.

Thus, by providing the differential valve 43 in the piping connection unit 42, both the connection unit and the piping can be made simplified.

The Second Embodiment

Figure 8A:
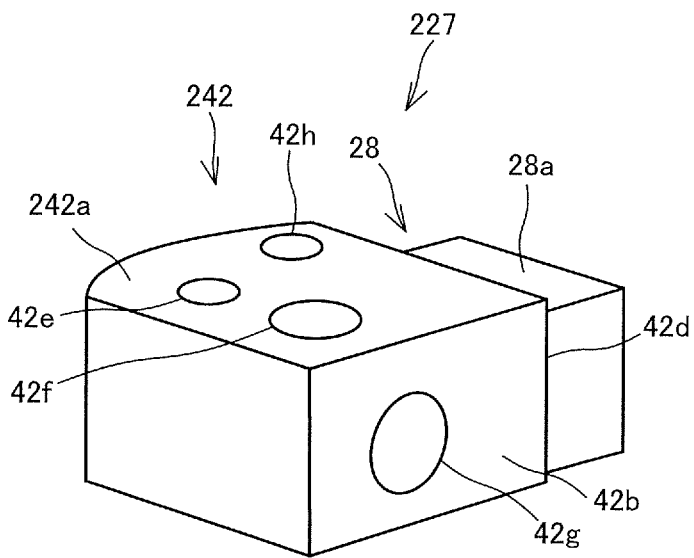
FIG. 8A is a perspective view of a piping connection unit in a gas-liquid separator according to a second embodiment of the present invention.
Figure 8B:
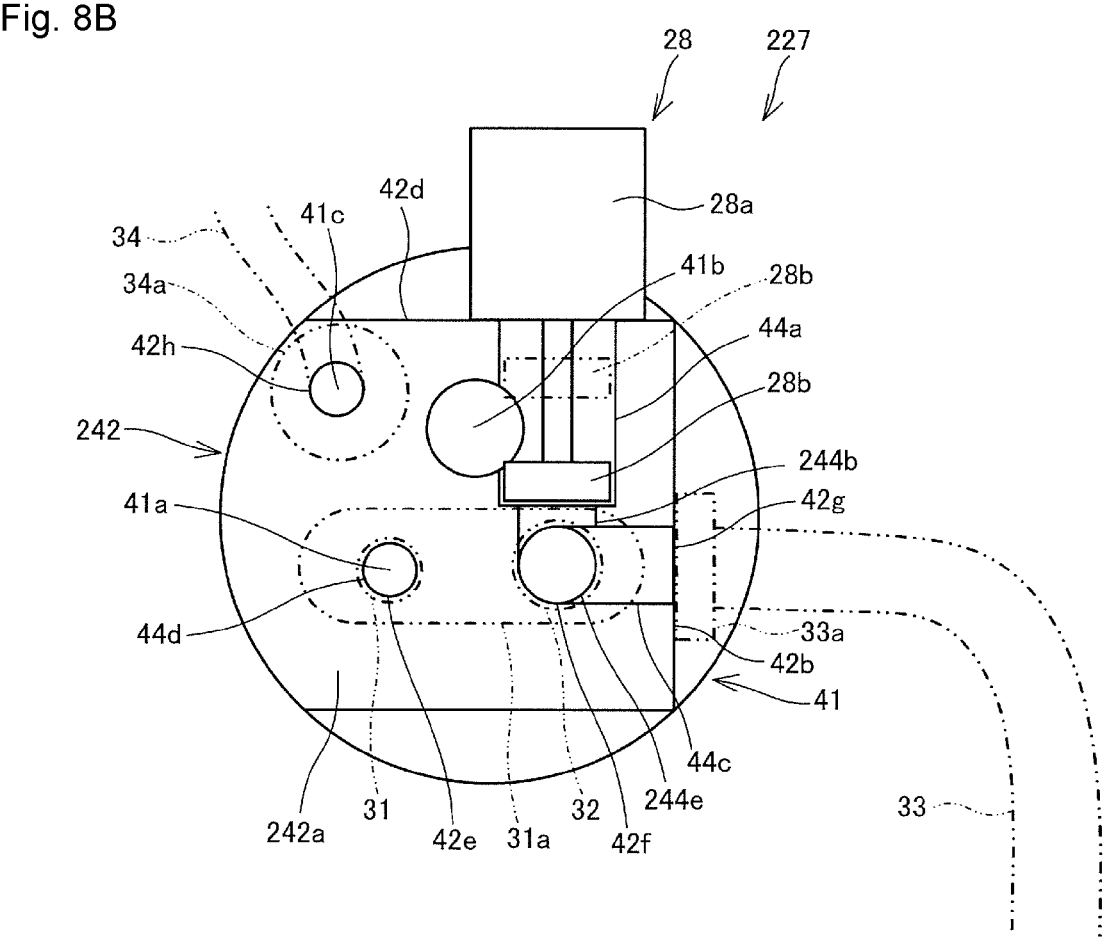
FIG. 8B is a cross-sectional view of a plane of the piping connection unit shown in FIG. 8A.

In the next, by referring to FIG. 8A and FIG. 8B, the gas-liquid separator 227 according to a second embodiment of the present invention is illustrated. In the following embodiments, differences from the first embodiment are mainly described with the same components denoted by the same reference numerals, and the descriptions thereof are omitted.

A gas-liquid separator 227 includes the tank unit 41 and a piping connection unit 242.

As shown in FIG. 8A, the piping connection unit 242 includes a first connection surface 242a, the second connection surface 42b, and the solenoid attachment surface 42d.

The first connection surface 242a is a plane formed at the upper end of the piping connection unit 242. The first connection piping 31, the second connection piping 32, and the fourth connection piping 34 are connected to the first connection surface 242a. The first connection surface 242a is connected to a single flange unit 31a that is integrally coupled to the end units of the first connection piping 31 with the second connection piping 32, and to a flange unit 34a of the fourth connection piping 34.

Since the first connection surface 242a is directed upward of the vehicle and the second connection surface 42b faces the side of the vehicle, the third connection piping 33 is provided at a right angle to the second connection piping 32. Therefore, the flow direction of the refrigerant is shifted to a right angle in the piping connecting unit 242. Accordingly, the third connection piping 33 which is bent rearward toward the compressor 21 is connected to the side of the vehicle, thereby allowing the routing of the piping to be simplified.

As shown in FIG. 8B, the piping connection unit 242 includes the first internal piping 44a, the second internal piping 244b, the third internal piping 44c, the fourth internal piping 44d, and the fifth internal piping 244e.

The second internal piping 244b is in linear communication with the first internal piping 44a. During cooling operation, the valve element 28b is in the position indicated by a solid line. Therefore, the gaseous refrigerant is guided to the second internal piping 44b from the second connection piping 32. On the other hand, during heating operation, the valve element 28b is in the position indicated by a chain double-dashed line. Therefore, the gaseous refrigerant is guided from the first internal piping 44a to the second internal piping 44b.

The fifth internal piping 244e is connected to the second connection piping 32. The second internal piping 244b communicates with the second internal piping 244b at a right angle. The fifth internal piping 244e communicates with the third internal piping 44c crossing at a right angle.

According to the second embodiment described above, the same effects as those of the first embodiment can be obtained, and the flange unit 31a of the first connection piping 31 and the second connection piping 32 can be connected to the piping connection unit 242 from above. Therefore, the workability in piping and connecting can be improved.

The Third Embodiment

Figure 9A:
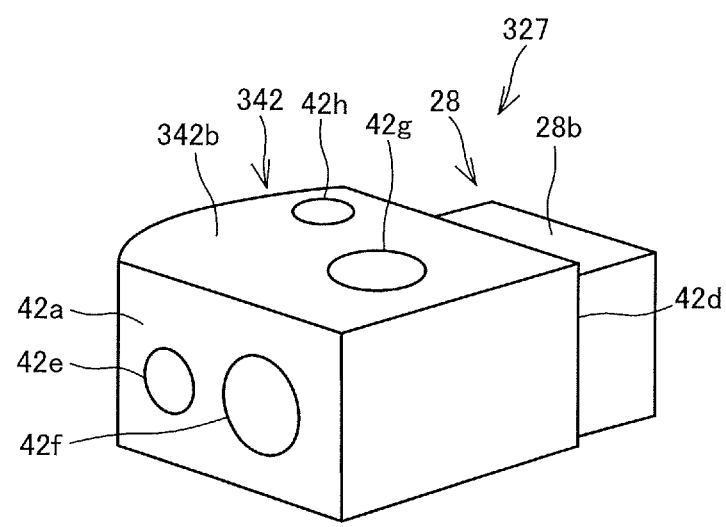
FIG. 9A is a perspective view of a piping connection unit in a gas-liquid separator according to a third embodiment of the present invention.
Figure 9B:
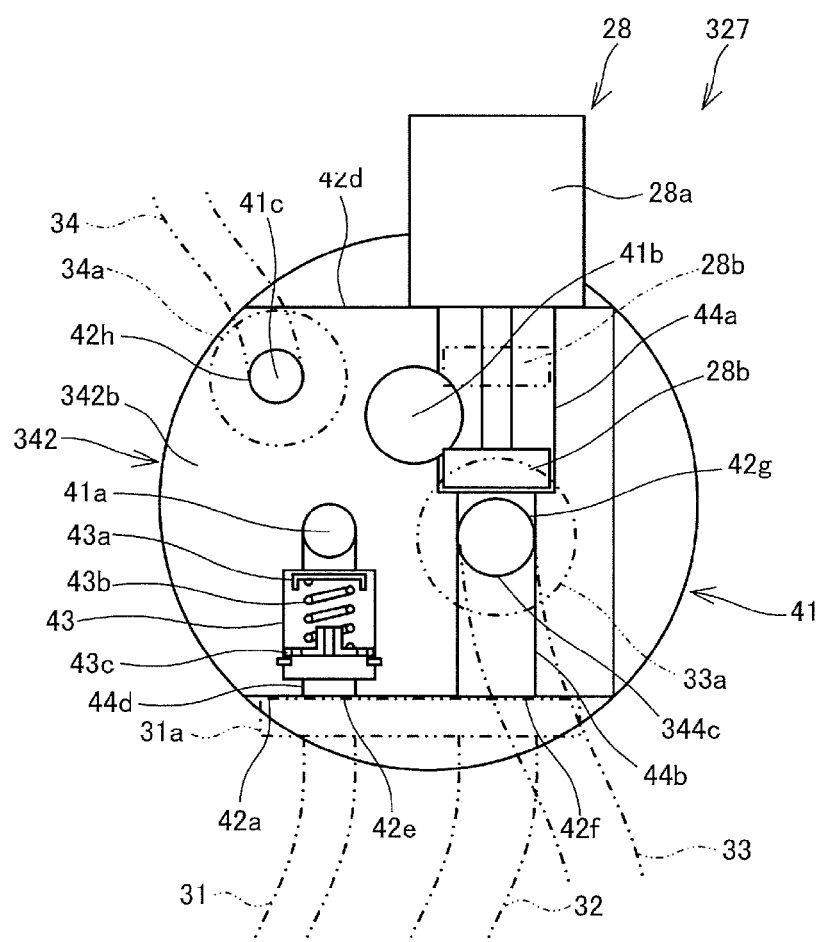
FIG. 9B is a cross-sectional view of a plane of the piping connection unit shown in FIG. 9A.

In the next, by referring to FIGS. 9A and 9B, the liquid separator 327 of the present invention according to the third embodiment is illustrated.

The gas-liquid separator 327 includes a tank unit 41 and a piping connection unit 342.

As shown in FIG. 9A, the piping connection unit 342 includes the first connection surface 42a, a second connection surface 342b, and the solenoid attachment surface 42d.

The second connection surface 342b is the plane formed at the upper end of the piping connection unit 342. The third connection piping 33 and the fourth connection piping 34 are connected to the second connection surface 342b. The flange unit 33a of the third connection piping 33 and the flange unit 34a of the fourth connection piping 34 are connected to the second connection surface 342b.

Since the first connection surface 242a faces the rear of the vehicle and the second connection surface 342b faces upward of the vehicle, the third connection piping 33 is provided at a right angle to the second connection piping 32. Therefore, the flow direction of the refrigerant is shifted in right angle in the piping connecting unit 342. Accordingly, the third connection piping 33 which is bent rearward toward the compressor 21 is connected facing the upper side of the vehicle, thereby simplifying the routing of the piping.

As shown in FIG. 9B, the piping connection unit 342 includes the first internal piping 44a, the second internal piping 44b, a third internal piping 344c, and the fourth internal piping 44d.

The third internal piping 344c is connected to the third connection piping 33. The third internal piping 344c is connected to the second internal piping 44b so as to shift the moving direction of the gaseous refrigerant 90 degrees from horizontal direction to vertical direction. The third internal piping 344c guides the gaseous refrigerant from the second internal piping 44b to the third connection piping 33.

According to the third embodiment described above, the same effects as those of the first embodiment can be obtained, and the flange unit 33a of the third connection piping 33 can be connected to the piping connection unit 342 from above. Therefore, the workability of piping and connecting can be improved.

The Fourth Embodiment

Figure 10A:
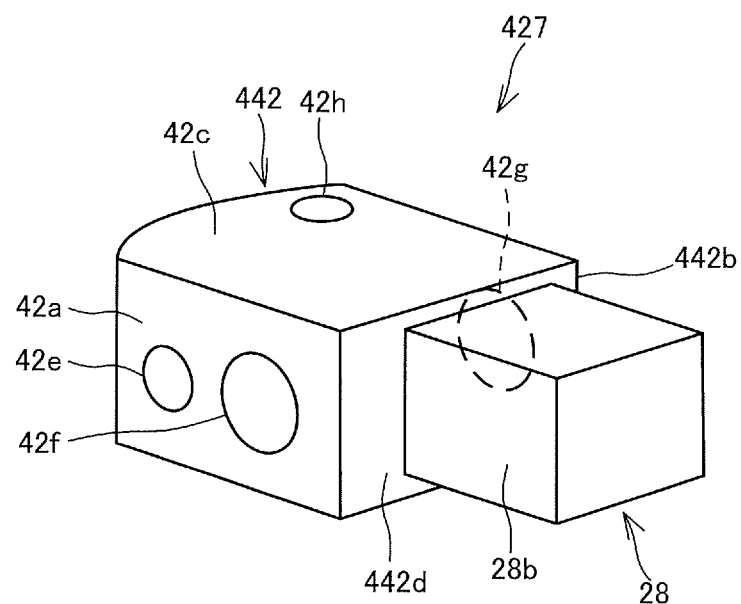
FIG. 10A is a perspective view of a piping connection unit in a gas-liquid separator according to a fourth embodiment of the present invention.
Figure 10B:
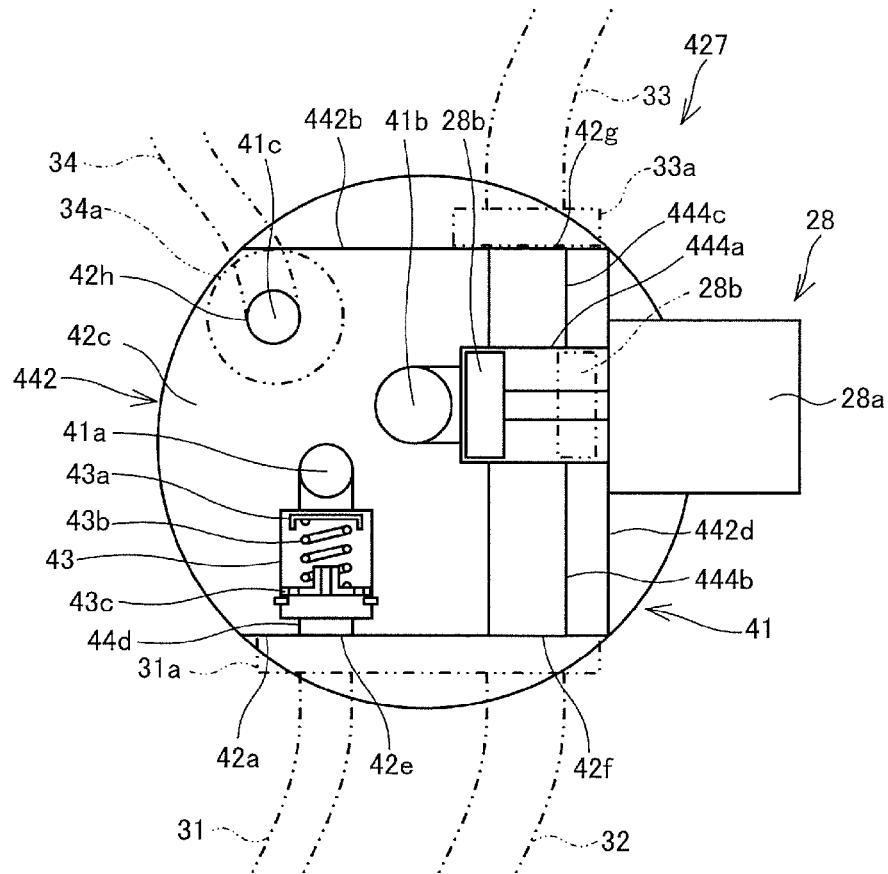
FIG. 10B is a cross-sectional view of a plane of the piping connection unit shown in FIG. 10A.

In the next, by referring FIGS. 10A and 10B, a gas-liquid separator 427 according to the fourth embodiment of the present invention is illustrated.

A gas-liquid separator 427 includes a tank unit 41 and a piping connection unit 442.

As shown in FIG. 10A, the piping connection unit 442 includes the first connection surface 42a, a second connection surface 442b, the third connection surface 42c, and a solenoid attachment surface 442d.

The second connection surface 442b is a plane formed toward the front of the vehicle. The third connection piping 33 is connected to the second connection surface 442b. The flange unit 33a formed at an end unit of the third connection piping 33 is connected to the second connection surface 442b.

Since the first connection surface 42a is directing the rear of the vehicle and the second connection surface 442b is directing forward of the vehicle, the third connection unit 42g is formed on the second connection surface 442b opposite to the first connection surface 42a so as to communicate with the second connection unit 42f in a straight line shape in the piping connection unit 42.

The solenoid mounting surface 442d is a plane formed toward the side of the vehicle. The solenoid 28a is attached to the solenoid mounting surface 442d so that the valve body 28b of the first flow path switching valve 28 is inserted into the piping connection unit 442.

As shown in FIG. 10B, the piping connection unit 442 includes a first internal piping 444a, a second internal piping 444b, a third internal piping 444c, and a fourth internal piping 444d.

The gaseous refrigerant is guided from the interior of the tank unit 41 to the first internal piping 444a through the gaseous refrigerant lead-out piping 41b. The gaseous refrigerant guided in vertical direction from the gaseous refrigerant outlet piping 41b is shifted by 90 degrees in the moving direction so as to move in horizontal direction, and is guided to the first internal piping 444a. The first internal piping 444a further changes the advancing direction of the gaseous refrigerant by 90 degrees in horizontal direction. The first internal piping 444a is provided with a first flow path switching valve 28.

The valve body 28b of the first flow path switching valve 28 is biased in a direction opposite to the pressure of the refrigerant flowing from the tank unit 41 toward the compressor 21 during cooling operation to maintain the blocking state.

The second internal piping 444b is connected to the second connection piping 32. The second internal piping 444b is in communication with the first internal piping 444a in a straight line shape. During cooling operation, the valve body 28b is in the position indicated by a solid line. Therefore, the gaseous refrigerant is guided to the second internal piping 444b through the third internal piping 444c and the first internal piping 444a from the second connection piping 32. On the other hand, during heating operation, the valve body 28b is in the position indicated by a chain double-dashed line. Accordingly, the gaseous refrigerant is guided to the second internal piping 444b from the interior of the tank unit 41 through the first internal piping 444a.

The third internal piping 444c is connected to the third connection piping 33. The third internal piping 444c guides the gaseous refrigerant from the first internal piping 444a to the third connection piping 33. The third internal piping 444c is formed linearly with the second internal piping 444b via the first internal piping 444a. As a result, the direction is changed in the third connection piping 33 without changing the direction of the refrigerant in the piping connecting unit 442, allowing the refrigerant to flow smoothly.

According to the fourth embodiment described above, the same effects as those of the first embodiment can be obtained, and in addition, the following effects are achieved.

In the gas-liquid separator 427, the third connection unit 42g is formed in the second connection surface 442b opposite to the first connection surface 42a so as to communicate with the second connection unit 42f in the piping connection unit 442 in a straight line shape. As a result, the direction is changed in the third connection piping 33 without having to change the direction of the refrigerant in the piping connecting unit 442, allowing the refrigerant to flow more smoothly in comparison compared to the case where the direction of the refrigerant is changed in the piping connection unit 442.

In the gas-liquid separator 427, as compared with the first to third embodiments, the number of times the refrigerant guided from the tank unit 41 to the third connection piping 33 is changed in the advancing direction is small. Therefore, in the gas-liquid separator 427, it is possible to smoothly flow the refrigerant guided from the interior of the tank unit 41 to the third connection piping 33.

The Fifth Embodiment

Figure 11A:
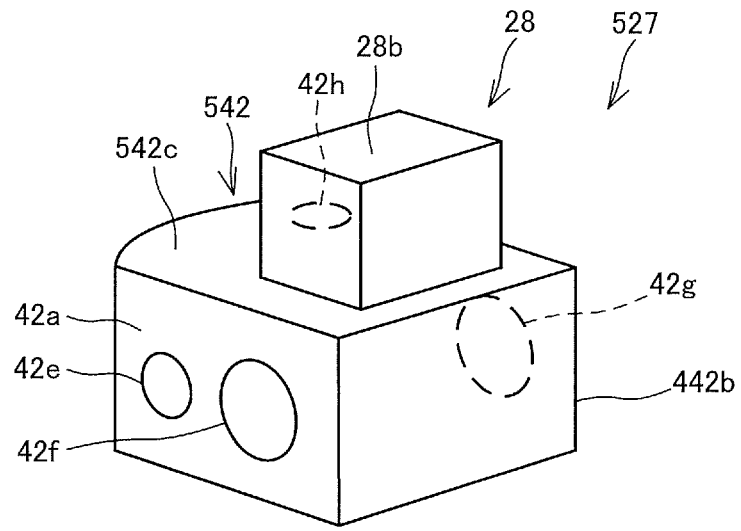
FIG. 11A is a perspective view of a piping connection unit in a gas-liquid separator according to a fifth embodiment of the present invention.
Figure 11B:
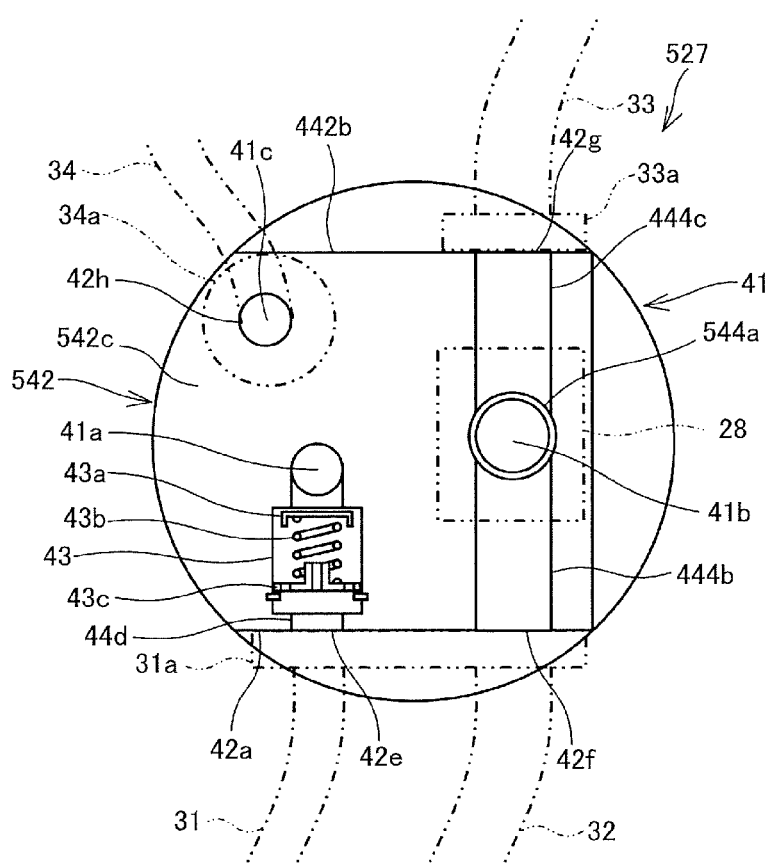
FIG. 11B is a cross-sectional view of a plane of the piping connection unit shown in FIG. 11A.

In the next, by referring to FIGS. 11A and 11B, the gas-liquid separator 527 according to the fifth embodiment of the present invention is illustrated.

A gas-liquid separator 527 includes the tank unit 41 and a piping connection unit 542.

As shown in FIG. 11A, the piping connection unit 542 includes a first connection surface 42a, a second connection surface 442b, and a third connection surface 542c.

The third connection surface 542c is a plane formed on the upper end of the piping connection 542. The fourth connection piping 34 and the solenoid 28a are connected to the third connection surface 542c. A flange unit 34a formed at an end unit of the fourth connection piping 34 is connected to the third connection surface 542c. The solenoid 28a is attached to the third connection surface 542c such that the valve body 28b of the first flow path switching valve 28 is inserted into the piping connection unit 542.

As shown in FIG. 11B, the piping connection unit 542 includes a first internal piping 544a, a second internal piping 444b, a third internal piping 444c, and a fourth internal piping 44d.

The gaseous refrigerant is guided to the first internal piping 544a through the gaseous refrigerant lead-out piping 41b from the interior of the tank unit 41. The gaseous refrigerant guided in vertical direction from the gaseous refrigerant outlet piping 41b is guided to the first internal piping 544a. The first internal piping 544a changes the advancing direction by 90 degrees so that the gaseous refrigerant guided in vertical direction proceeds in horizontal direction. The first internal piping 544a is provided with the first flow path switching valve 28.

The valve body 28b of the first flow path switching valve 28 is biased in a direction opposite to the pressure of the refrigerant flowing from the tank unit 41 toward the compressor 21 during cooling operation to maintain the blocking state.

According to the fifth embodiment described above, the same effects as those of the fourth embodiment can be obtained, and in addition, the following effects are achieved.

In the gas-liquid separator 527, as compared with the fourth embodiment, the number of times of the shifting a direction for the refrigerant guided from the tank unit 41 to the third connection piping 33 is further reduced. Therefore, in the gas-liquid separator 527, the refrigerant guided from the interior of the tank unit 41 can be more smoothly supplied to the third connection piping 33.

The Sixth Embodiment

Figure 12A:
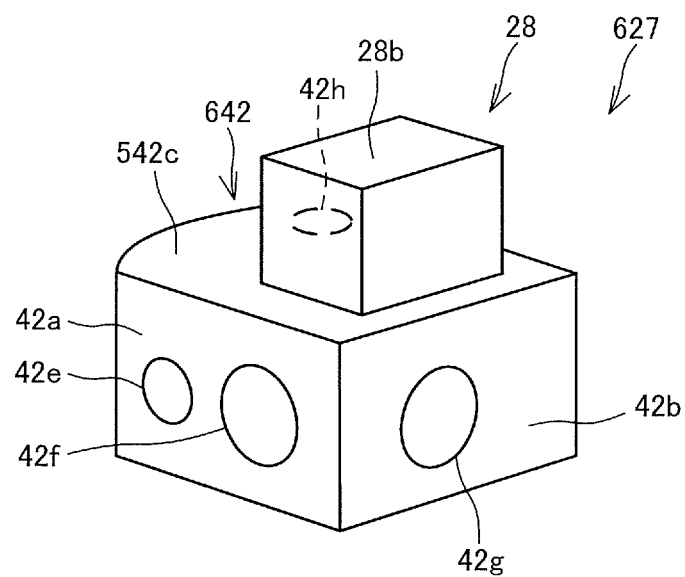
FIG. 12A is a perspective view of a piping connection unit in a gas-liquid separator according to a sixth embodiment of the present invention.
Figure 12B:
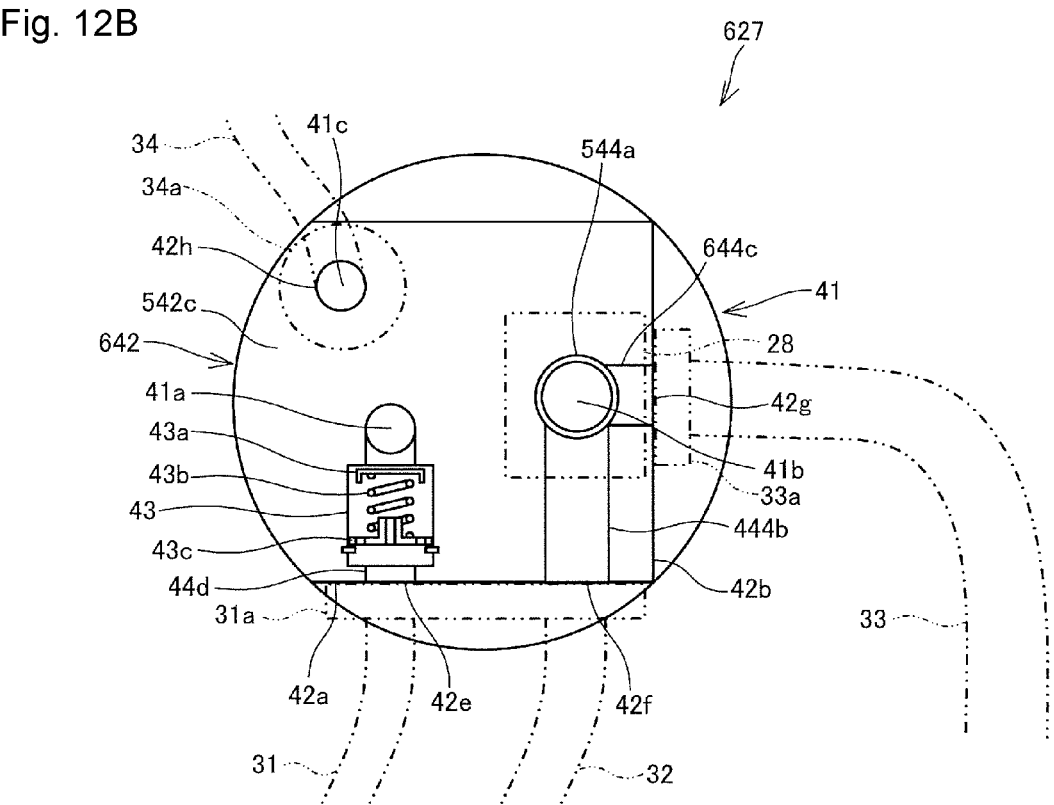
FIG. 12B is a cross-sectional view of a plane of the piping connection unit shown in FIG. 12A.

In the next, by referring to FIGS. 12A and 12B, the gas-liquid separator 627 according to the sixth embodiment of the present invention is illustrated.

A gas-liquid separator 627 includes the tank unit 41 and a piping connection unit 642.

As shown in FIG. 12A, the piping connection unit 642 includes the first connection surface 42a, the second connection surface 42b, and the third connection surface 542c.

As shown in FIG. 12B, the piping connection unit 542 includes a first internal piping 544a, a second internal piping 444b, a third internal piping 644c, and a fourth internal piping 44d.

The third internal piping 644c is connected to the third connection piping 33. The third internal piping 644c guides the gaseous refrigerant from the first internal piping 444a to the third connection piping 33. The third internal piping 444c is formed so as to orthogonally intersect the second internal piping 444b via the first internal piping 444a. Therefore, the flow direction of the refrigerant is shifted to a right angle in the piping connection unit 642. Accordingly, the third connection piping 33 which is bent rearward toward the compressor 21 is connected to the side of the vehicle, thereby allowing the routing of the piping to be simplified.

According to the sixth embodiment described above, the same effects as those of the first embodiment can be obtained.

The Seventh Embodiment

Figure 13A:
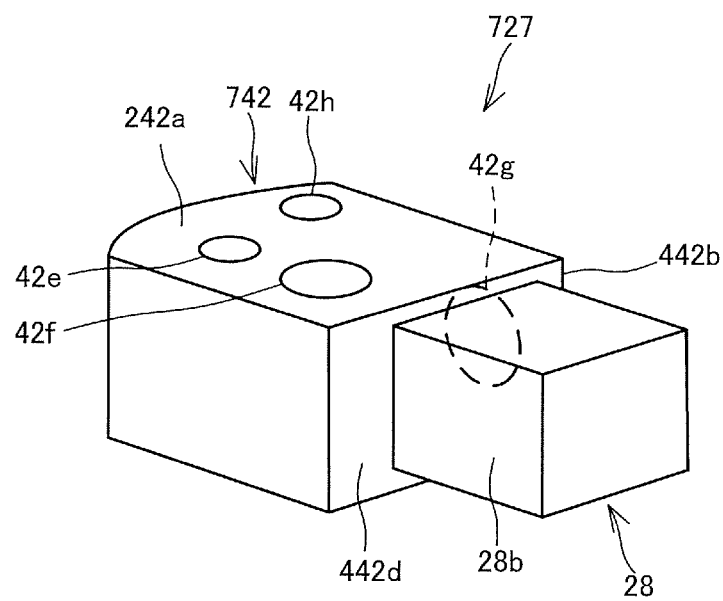
FIG. 13A is a perspective view of a piping connection unit in a gas-liquid separator according to a seventh embodiment of the present invention.
Figure 13B:
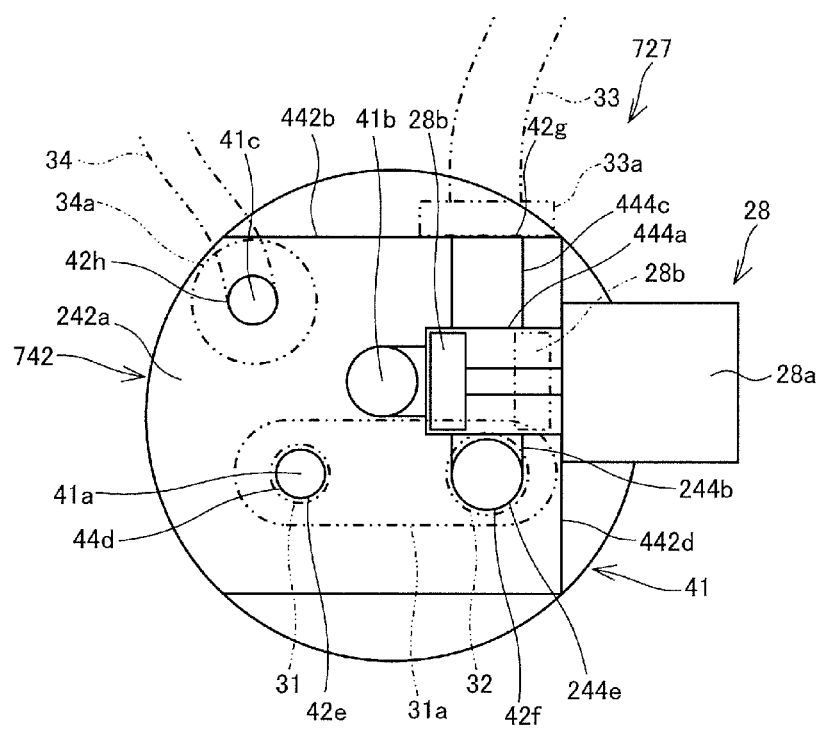
FIG. 13B is a cross-sectional view of a plane of the piping connection unit shown in FIG. 13A.

In the next, by referring to FIGS. 13A and 13B, the gas-liquid separator 727 according to the seventh embodiment of the present invention is illustrated.

A gas-liquid separator 727 includes the tank unit 41 and a piping connection unit 742.

As shown in FIG. 13A, the piping connection unit 742 includes the first connection surface 242a, the second connection surface 4442b, and the solenoid attachment surface 442d.

As shown in FIG. 13B, the piping connection unit 742 includes the first internal piping 444a, the second internal piping 244b, the third internal piping 444c, the fourth internal piping 44d, and the fifth internal piping 244e.

According to the seventh embodiment described above, the same effects as those of the first embodiment can be obtained, the flange unit 31a of the first connection piping 31 and the second connection piping 32 can be connected to the piping connection unit 742 from above. Therefore, the workability in assembling the piping connection can be improved.

While certain embodiments have been described, these embodiments have been presented by way of examples only, and are not intended to limit the scope of the inventions to the specific configurations of the embodiments.

The invention claimed is:

1. A system having a gas-liquid separator applied to a refrigerating cycle, the refrigerating cycle comprising: a compressor configured to compress refrigerant; an exterior heat exchanger configured to exchange heat between the refrigerant and external air; an evaporator configured to evaporate the refrigerant by having the refrigerant absorb the heat of the air guided into a vehicle compartment; a heater configured to heat the air guided into the vehicle compartment by using the heat of the refrigerant compressed by the compressor; and an expansion valve configured to decompress and expand the refrigerant that has passed through the exterior heat exchanger, wherein the gas-liquid separator configured to guide the incoming refrigerant from the exterior heat exchanger into the compressor during heating operation, and the gas-liquid separator configured to guide the incoming refrigerant from the exterior heat exchanger into the expansion valve during cooling operation, the gas-liquid separator includes: a tank unit configured to store the refrigerant to separate a gas phase refrigerant and a liquid phase refrigerant from each other, and a piping connection unit provided on top of the tank unit, the piping connection unit forming an inlet and outlet of the refrigerant from the tank unit, the piping connection unit includes: a first connection unit connected to a first connection piping, the first connection piping being configured to guide the refrigerant into the expansion valve; a second connection unit connected to a second connection piping in which the refrigerant that has passed through the evaporator returns; a third connection unit connected to a third connection piping, the third connection unit being configured to guide the refrigerant into the compressor; a fourth connection unit connected to a fourth connection piping, the fourth connection unit being configured to guide the refrigerant from the exterior heat exchanger into the tank unit; and a switching valve allowing the interior of the tank unit to communicate with the third connection piping during heating operation, and allowing the second connection piping to communicate with the third connection piping during cooling operation.

2. The gas-liquid separator according to claim 1, wherein the switching valve allows the second connection piping to communicate directly with the third connection piping within the interior of the piping connection unit by blocking the flow of the refrigerant from the tank unit toward the compressor during cooling operation.

3. The gas-liquid separator according to claim 2, wherein the switching valve includes a valve element configured to advance and retreat within the interior of the piping connection unit,
the valve element maintains its blocking state by the pressure from the refrigerant moving from the interior of the tank unit toward the compressor as a back pressure during cooling operation.

4. The gas-liquid separator according to claim 1, wherein the first connection unit is formed on the first connection surface in the piping connection unit, and
the second connection unit is formed on a first connection surface.

5. The gas-liquid separator according to claim 4, wherein the third connection unit is formed on a second connection surface orthogonal to the first connection surface.

6. The gas-liquid separator according to claim 4, wherein the third connection unit is formed on the second connection surface opposite to the first connection surface such that the third connection unit communicates with the second connection unit in the interior of the piping connection unit in a straight line shape.

7. The gas-liquid separator according to claim 1, wherein the first connection unit, the second connection unit, and the third connection unit are formed on the side of the piping connection unit.

8. The gas-liquid separator according to claim 1, wherein the piping connection unit includes a differential valve, the differential valve being configured to open when the pressure of the refrigerant guided by the expansion valve exceeds a predetermined pressure during cooling operation.

\* \* \* \* \*